United States Patent
Söderholm et al.

[19]

[11] Patent Number: 6,122,977
[45] Date of Patent: Sep. 26, 2000

[54] IMPELLER TORQUE MEASURING DEVICE

[75] Inventors: Arne Söderholm; Olle Söderholm, both of Bromma, Sweden

[73] Assignee: S. E. G. Mekanik AB, Amal, Sweden

[21] Appl. No.: 09/021,936

[22] Filed: Feb. 11, 1998

[30] Foreign Application Priority Data

Feb. 11, 1997 [EP] European Pat. Off. .............. 97850020

[51] Int. Cl.⁷ ................................. G01F 1/84; G01L 3/00
[52] U.S. Cl. .................................... 73/861.354; 73/862.08
[58] Field of Search ........................... 73/861.354, 862.08

[56] References Cited

U.S. PATENT DOCUMENTS

| | | | |
|---|---|---|---|
| 2,771,772 | 11/1956 | Kirwan | 73/861.354 |
| 2,771,773 | 11/1956 | Wallace . | |
| 4,700,578 | 10/1987 | Fassbinder | 73/861.354 |
| 5,191,802 | 3/1993 | Fassbinder | 73/861.354 |

FOREIGN PATENT DOCUMENTS

| | | |
|---|---|---|
| 0 196 440 | 10/1986 | European Pat. Off. . |
| 0 474 121 | 3/1992 | European Pat. Off. . |
| 0 590 187 | 4/1994 | European Pat. Off. . |

*Primary Examiner*—Harshad Patel
*Attorney, Agent, or Firm*—Pillsbury Madison & Sutro LLP

[57] ABSTRACT

The invention relates to an impeller torque measuring device for a measuring device in which the mass flow rate, in particular of a bulk material or a fluid, is measured by using the Coriolis measuring principle, comprising an impeller (1) mounted for rotation on a vertical shaft (2) driven by a motor (3), the impeller (1) mounted on one end of the shaft (2) and the motor (3) on the other end of the shaft (2), and wherein the mass flow is charged into the central area of the rotating impeller (1) on which the mass is radially directed to leave the rotating impeller (1) over its circumferential edge, and wherein the torque necessary for rotating the impeller is measured by a torque measuring device (4). The shaft (2) and the motor (3) are connected to a stand (14, 15, 16) supporting the impeller torque measuring device by means of the torque measuring device (4) measuring the torque exerted by the motor (3).

10 Claims, 3 Drawing Sheets

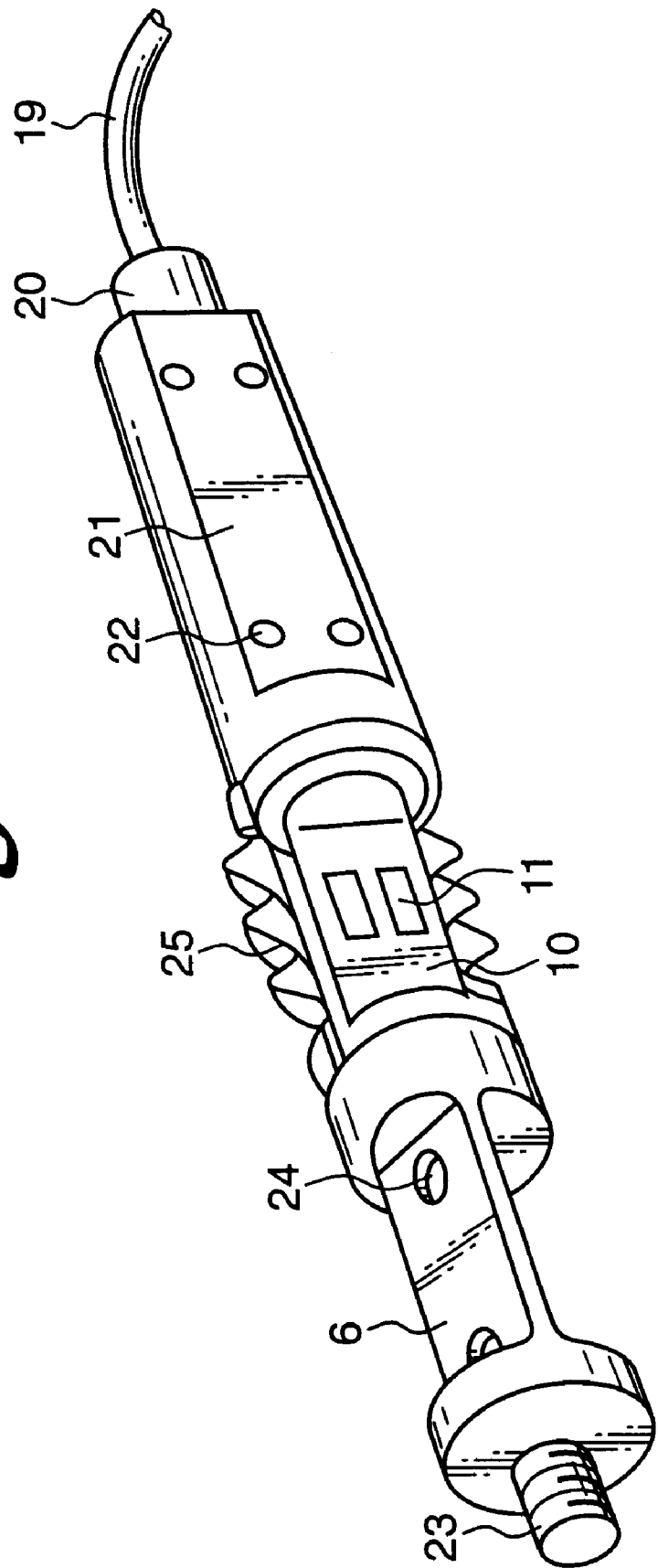

IMPELLER TORQUE MEASURING DEVICE

FIELD OF THE INVENTION

The present invention relates to an apparatus for measuring a mass flow, in particular bulk material or a fluid, and the invention especially relates to an impeller torque measuring device used in a measuring device in which the mass flow rate is measured by using the Coriolis measuring principle.

BACKGROUND OF THE INVENTION

Such a prior measuring device is known from our copending European patent application No. 96850202.1, filed on Nov. 29, 1996 related to U.S. application Ser. No. 08/980,354 filed Nov. 28, 1997, describing the main principles for such a mass flow meter, and to which application herewith is referred.

In such a measuring device the particles to be measured are subjected to tangential acceleration in a whirling impeller, and the torque exerted on the vanes of the impeller in reaction to the Coriolis force of accelerated particles is being measured as an indication of the mass flow rate. The object of our above European patent application was to avoid measurement errors, due to uneven distribution of the material to be measured.

SUMMARY OF THE INVENTION

The object of the present invention is to provide a device for accurately measuring the torque exerted by the material on the impeller vanes.

The above object has been obtained in that the invention has been given the characterizing features stated in the appended claims.

BRIEF DESCRIPTION OF THE DRAWINGS

The invention will now be described in the form of a couple of non-limiting embodiments, shown on the enclosed drawings, in which FIG. 3 shows a perspective view of the torque transducer used in the device according to FIG. 1.

DETAILED DESCRIPTION OF THE DRAWINGS

Figure 1:
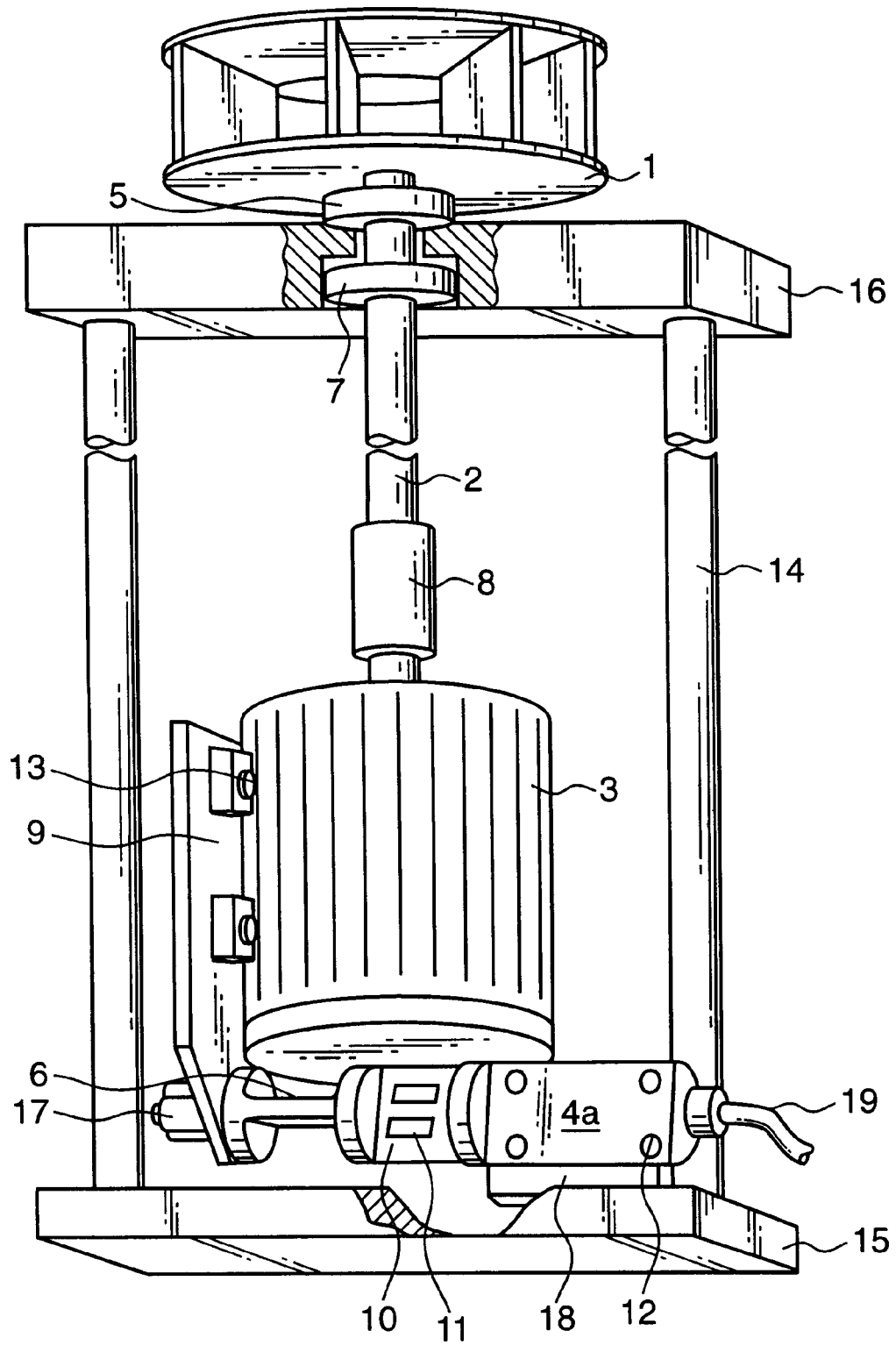
FIG. 1 shows a schematic perspective view of part of a mass flow measuring device including an impeller with its drive shaft, drive motor and torque measuring device according to a first embodiment of the invention.

The part of the device shown in FIG. 1 is intended to be a part of a complete device for measuring a mass flow of the kind described in our copending European patent application No. 96850202.1, but in this Fig. is only shown the impeller 1 and its drive and torque measuring devices. The other parts relating to the measuring device can have the same, but also alternative, designs as those shown in our previous application.

The impeller 1 is mounted for rotation on a vertical shaft 2, driven by an electric motor 3, wherein the shaft 2 and the motor 3 are located under the impeller 1. The impeller 1 is mounted on the upper end of the shaft 2 and the motor 3 on the other end. Under the motor 3 a torque transducer 4a is located. The shaft 2 is journalled in a thrust bearing 5, supported by a bearing cage 16 which in its turn by means of two columns 14 is connected to a base frame 15, supporting the complete measuring device. By means of the thrust bearing 5 the weight of the impeller and the electric motor 3 is supported on the base frame 15. A radial bearing 7 is journalling the shaft 2 in the radial direction in the bearing cage 16, and is thus preventing the shaft 2 and the motor 3 from radial displacement. The shaft 2 is by means of a coupling 8 connected to the motor shaft of the motor 3. The base frame 15, the two columns 14 and the bearing cage 16 together form a stand for the measuring device.

On the motor body is attached a fastening plate 9, attached to the motor body by means of attachment screws 13, and to the lower end of the fastening plate 9 a transfer part 6 rigid in the horizontal plane is connected. The transfer part 6 is preferably made integral with the torque transducer 4a, and the transfer part 6 and the torque transducer 4a are interconnected by a torque measuring section 10, comprising a strain gauge 11 for measuring the torque exerted by the motor 3 on the fastening plate 9 and the transfer part 6. The torque transducer 4a is by a connection cable 19 connected to an electronic device, not shown, e.g. a micro computer for evaluation of the torque signal and for controlling the measuring device. The body of the torque transducer 4a is attached to an angle bar 18 by means of attachment bolts 12, and the angle bar 18 is attached to the base frame 15.

The torque measuring device shown in FIG. 1 is made with a weak fixation in vertical direction, meaning that the torque transducer 4a can not to carry thrust loads from the motor 3 and the impeller 1. The transfer part 6 can only carry loads in the horizontal plane, and has no ability to carry loads in the vertical plane.

Figure 2:
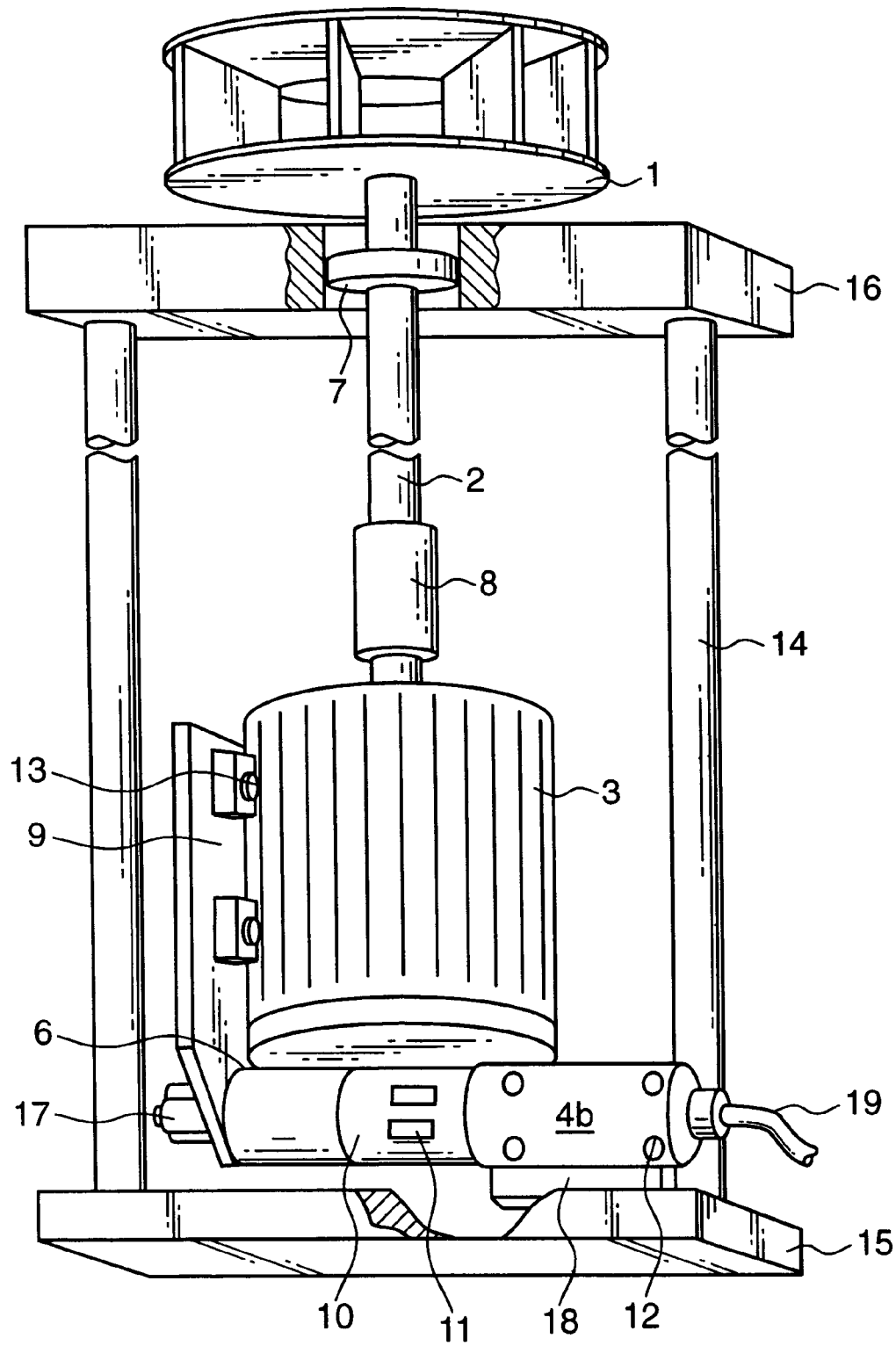
FIG. 2 shows a view corresponding to FIG. 1 of a second embodiment of the invention.

In FIG. 2 is shown a torque measuring device essentially corresponding to the one shown in FIG. 1, but differing in that the torque transducer 4b is made to also be able to carry thrust loads from the motor 3 and the impeller 1. The impeller 1 is in this case not supported on the bearing cage 16, as there is no thrust bearing for supporting the weight of the impeller and the electric motor 3. There is only a radial bearing 7, inside the bearing cage 16, for journalling the shaft 2 when passing through the bearing cage 16. The transfer part 6, also in this case made integral with the torque transducer 4b, is here made of a material having about the same stiffness in horizontal and vertical directions.

FIG. 3 shows in detail the torque transducer 4a. In one end of the torque transducer 4a the transfer part 6 is located, which ends by a threaded stud 23, which by means of a threaded nut 17 can be secured to the fastening plate 9 for fastening the torque transducer to the motor 3. As shown in FIG. 3 the transfer part 6 can be perforated by holes 24, for making the transfer part weaker in vertical direction. In the end of the torque transducer 4a opposite to the transfer part 6 a connection plane 21 is located, in which threaded connection holes 22 are made for attaching the torque transducer 4a the angle bar 18 by means of the attachment bolts 12 screwed into the threaded connection holes 22. At the end of the connection part the connection wire 19 is connected to the torque transducer 4a, and entering into the torque transducer 4a through a sealing sleeve 20. As further can be seen in FIG. 3 the torque measuring section 10, including the strain gauge 11 is covered by a pair of sealing bellows 25, to protect the strain gauge 11 from external influence.

The shaft and the motor can also be mounted in the stand so that they are both axially and radially journalled in the motor end of the shaft, not shown in the drawings. In this case the torque exerted on the motor is transferred to the torque transducer by means of a mechanical torque transferring device, such as a flexible torque shaft or a parallelogram.

What is claimed is:

1. A mass flow measuring device for measuring a mass flow rate of a flowing particulate material or a flowing fluid using the Coriolis measuring principle, said mass flow measuring device comprising:

a stand;

said stand including a bearing cage;

an impeller constructed and arranged to be positioned such that the flowing fluid or particulate material is directed into a central area of said impeller;

a vertical shaft, said impeller being mounted on a first end of said shaft such that rotating said shaft rotates said impeller, said first end of said shaft being journaled in said cage;

a motor mounted on a second end of the shaft opposite said first end, said motor being constructed and arranged to rotate said shaft;

said impeller being constructed and arranged such that the flowing fluid or particulate material flowing into the central area thereof applies a torque to said impeller that is transmitted to said motor through said shaft and such that the rotation of said impeller directs the flowing fluid or particulate material radially outwardly from the central area thereof; and a torque transducer mounted to said stand, said torque transducer being constructed and arranged to measure the torque transmitted to said motor through said shaft;

said motor and said second end of said shaft being mounted on and supported by said transducer such that said transducer connects said motor and the second end of said shaft to said stand.

2. A device according to claim 1, wherein the first end of the shaft is free to move radially relative to the motor and wherein a thrust bearing (5) on the bearing cage carries forces in an axial direction of the shaft (2), and wherein the connection of said motor to the torque transducer is flexible in the axial direction of said shaft.

3. A device according to claim 2, wherein the thrust bearing carries both thrust and radial forces and wherein the second end of said shaft and the motor are mounted fixed in radial and axial direction of the shaft, and wherein the torque exerted on the motor is transferred to the torque transducer by a mechanical torque transferring device.

4. A device according to claim 3, wherein a transducer part of the torque transducer and a transfer part are made of more than one solid piece.

5. A device according to claim 2, wherein a transducer part of the torque transducer and a transfer part are made of more than one solid piece.

6. A device according to claim 1, wherein the torque measuring device measures torque only in a plane perpendicular to the axial direction of the shaft.

7. A device according to claim 6, wherein a transducer part of the torque transducer and a transfer part are made of more than one solid piece.

8. A device according to claim 1, wherein the second end of said shaft and the motor are mounted fixed in radial and axial direction of the shaft, and wherein the torque exerted on the motor is transferred to the torque transducer by a mechanical torque transferring device.

9. A device according to claim 8, wherein a transducer part of the torque transducer and a transfer part are made of more than one solid piece.

10. A device according to claim 1, wherein a transducer part of the torque transducer and a transfer part are made of more than one solid piece.

* * * * *